United States Patent [19]

Jacobs

[11] Patent Number: 5,535,831
[45] Date of Patent: Jul. 16, 1996

[54] SAND DISTRIBUTOR AND SPREADER

[75] Inventor: Frank P. Jacobs, Akron, Ohio

[73] Assignee: BJS, Akron, Ohio

[21] Appl. No.: 283,534

[22] Filed: Aug. 1, 1994

[51] Int. Cl.$^6$ .................................................. A01B 39/10
[52] U.S. Cl. .......................... 172/29; 172/54.5; 172/101; 15/81
[58] Field of Search ............................. 172/29, 35, 54.5, 172/102, 101; 15/81, 50.2, 52.2

[56] References Cited

U.S. PATENT DOCUMENTS

| | | | |
|---|---|---|---|
| 608,121 | 7/1898 | Herr et al. | 172/54.5 |
| 1,472,208 | 10/1923 | Dawer | 15/50.2 |
| 1,844,455 | 2/1932 | Anderson et al. | 172/54.5 |
| 1,978,773 | 10/1934 | Trant | 15/81 |
| 3,499,494 | 3/1970 | Gijzenberg | 172/54.5 |
| 4,314,609 | 2/1982 | Chauvet | 172/54.5 |
| 5,477,927 | 12/1995 | Figura | 172/29 |

Primary Examiner—Spencer K. Warnick, IV
Attorney, Agent, or Firm—Renner, Kenner, Greive, Bobak, Taylor & Weber

[57] ABSTRACT

A sand distributor and spreader for filling sand into aerated holes in golf greens wherein a frame has slidably mounted thereon a plurality of brushes. A gear box, or other source of mechanical energy, is interconnected to the frame such that an output of the gear box selectively reciprocates the brushes between a first position and a second position. Furthermore, a plurality of wheels are rotatably mounted to the frame in such a manner that the frame can be moved, while the gear box output simultaneously reciprocates the brushes. Additionally, a mechanism is included so that the brushes may be lifted from the surface to be brushed so that the spreader may be easily moved. In an additional embodiment, an engine simultaneously reciprocates the brushes and rotates the wheels.

15 Claims, 3 Drawing Sheets

SAND DISTRIBUTOR AND SPREADER

TECHNICAL FIELD

The invention herein resides in the art of the maintenance and care of natural grass golf greens. More particularly, the invention relates to a machine for evenly distributing and spreading wet or dry sand on previously aerated golf greens. Specifically, the invention relates to a machine for evenly distributing and spreading sand on previously aerated golf greens that carries a plurality of reciprocating brushes, and which is easily transported between golf greens.

BACKGROUND ART

When playing a hole of golf, there are two distinct playing surfaces encountered. The first playing surface is a fairway which starts at the tee and extends to the golf green. Typically, the fairway will range in length from eighty to five hundred yards. While on the fairway, the golfer will hit the golf ball with a pre-selected wood or iron that will propel the ball onto the golf green. It is important for the golfer to stay on the fairway to avoid such hazards as sand, water, or high grass, commonly referred to as the rough. Hitting the ball into these hazard areas will greatly increase the number of strokes required to get the ball from the tee to the green. Of course, it is well known that the object in playing a hole of golf is to hit the golf ball into the hole with a minimal number of strokes. Thus, it is very important for the playing surfaces to be well maintained. Otherwise, the golf ball may be inadvertently diverted from its intended course.

The second distinct playing surface is a putting green, which is at the end of the fairway. Typically, golf greens have an irregular shape and with a putting surface which is generally flat, but can be made more challenging by incorporating hills or slopes thereon. It is imperative that there be no weeds or dead spots on the green to divert the path of a putted ball, for golfers become very upset if their ball is diverted by such an obstruction.

To obtain a smooth putting surface, golf greens are constructed using a base level of rock and gravel, an intermediate level comprising sand and dirt, and a final layer of very short tight grass. It is important for the grass surface to receive plenty of water and be well drained. Furthermore, it is important for the greens to be aerated so as to provide oxygen to the roots of the grass. To this end, it is known to aerate golf greens with spiked rollers that will pull small dirt plugs out of the putting surface. The aeration holes have several functions in addition to providing oxygen to the roots of the grass. These aeration holes provide a facile means for exposing weed killer and fertilizer to the grass of the putting surface, and for providing proper water drainage. Unfortunately, these aeration holes tend to collapse under the weight of the golfer's feet and by the impact of golf balls landing on the green. As a result, collapsing of the aeration holes creates an uneven putting surface.

To prevent the collapse of the aeration holes, it is well known to spread sand on the putting surface after the aeration has taken place. This sand is then brushed, swept, or otherwise worked into the holes thus filling the holes up and giving structural support to the surrounding surface. Furthermore, the sand still allows proper drainage and the application of weed killer and fertilizers to the putting surface.

However, spreading and distributing sand onto the putting surface is known to be a time consuming and labor intensive process. Typically, the sand is manually brushed into the aeration holes by use of a broom and/or blade so as to push the sand into the holes. Besides being labor intensive, the holes may be unevenly filled or not completely filled with sand so as to still allow collapsing thereabout.

It is clear that there is a need in the art for a device to evenly distribute and spread sand into an aerated golf green. There is also a need in the art for a machine to distribute and spread sand over a putting surface regardless of whether the sand is wet or dry. There is a further need for a machine to distribute and spread sand over a putting surface which is easy to maintain. Furthermore, there is a need to provide such a sand distributor and spreader that is easily transportable between putting surfaces.

DISCLOSURE OF THE INVENTION

In light of the foregoing, it is a first aspect of the invention to provide a sand distributor and spreader for uniformly spreading wet or dry sand onto the putting surfaces of a golf course.

Another aspect of the invention is to provide a sand distributor and spreader that greatly enhances the ability to provide superior manicured golf greens.

Still a further aspect of the invention is to provide a sand distributor and spreader that is easy to use, and provides a cost savings over manually spreading sand into aeration holes.

An additional aspect of the invention is to provide a sand distributor and spreader that is easily disengageable and can be readily transported between golf greens.

The foregoing and other aspects of the invention which shall become apparent as the detailed description proceeds, are achieved by a sand distributor and spreader, comprising: means for carrying a plurality of brushes; means for reciprocating said plurality of brushes; and means for transporting said means for carrying.

The present invention also provides a sand distributor and spreader, comprising: a frame having slidably mounted thereto a plurality of brushes; an engine mounted to said frame, said engine selectively reciprocating said brushes between a first position and a second position; and a plurality of wheels rotatably mounted to said frame, said engine rotatably moving said wheels while said brushes are reciprocating.

BEST MODE FOR CARRYING OUT THE INVENTION

Figure 1:
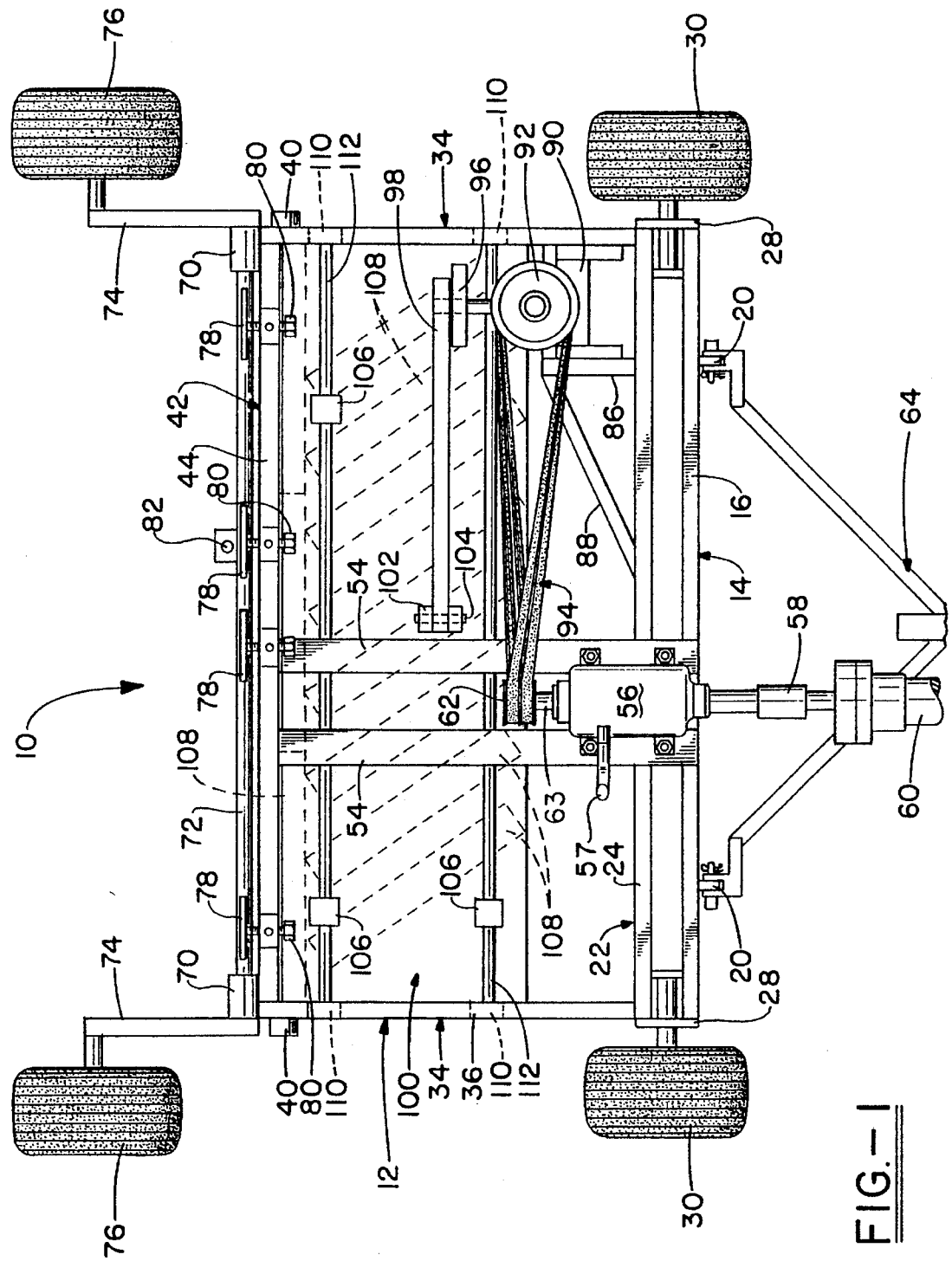
FIG. 1 is a top view showing a sand distributor and spreader according to the present invention.
Figure 3:
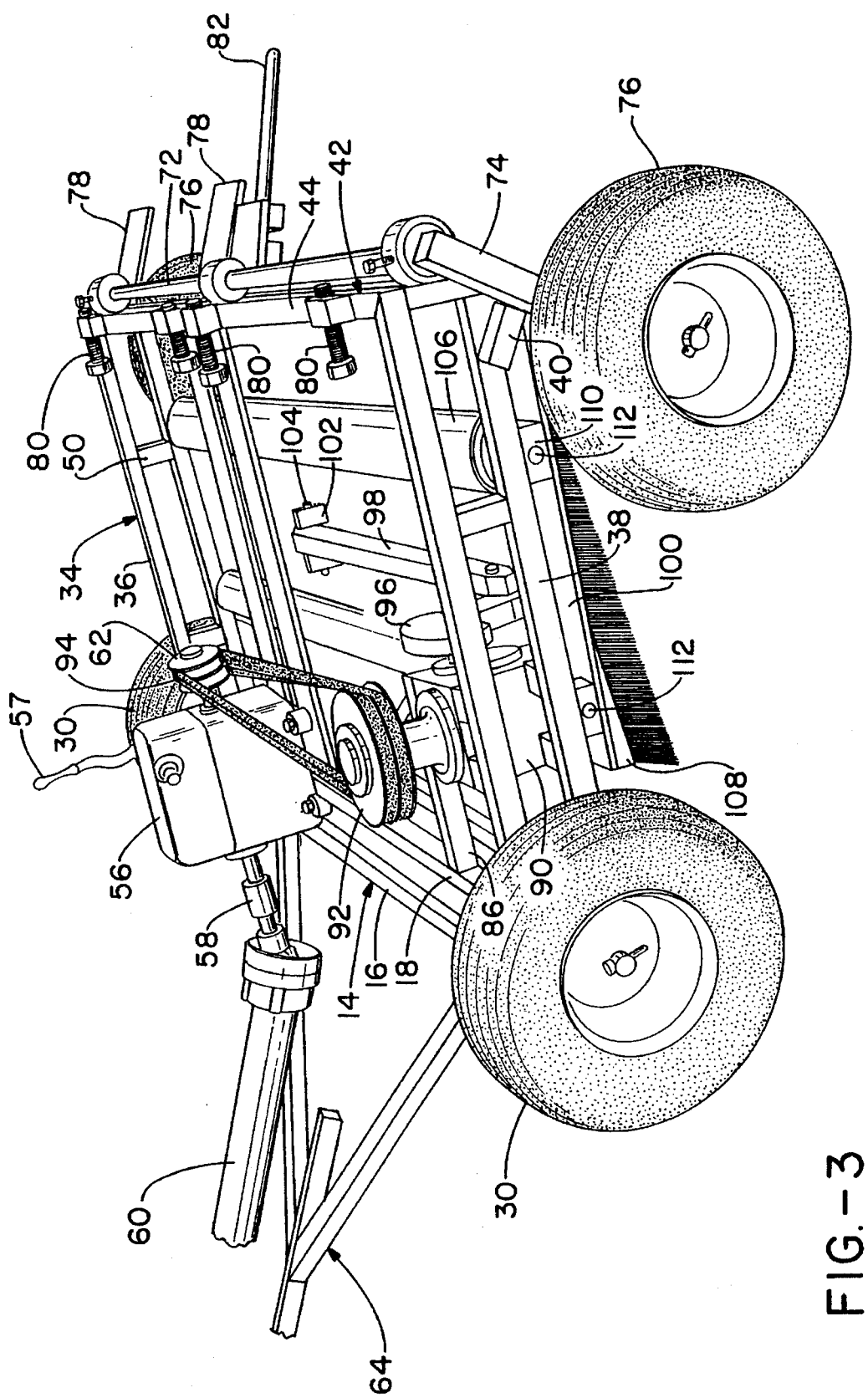
FIG. 3 is a perspective view showing a sand distributor and spreader in its elevated position for transport between golf greens.

Referring now to the drawings and more particularly to FIG. 1, it can be seen that a sand distributor and spreader according to the present invention is designated generally by the numeral 10. In the preferred embodiment of the invention the spreader 10 is pushed or pulled by a vehicle (not shown). However, it is contemplated that the spreader 10 may be configured as a self-propelled vehicle. The sand distributor and spreader 10 includes a frame 12, which is generally rectangular in shape, but which may be of any suitable configuration. As best seen in FIG. 3, the frame includes a front rail 14, which has an upper bar 16 in parallel relationship with a lower bar 18. A plurality of interconnecting couplers 20 are welded between the upper bar 16 and the lower bar 18.

In a parallel relationship with the front rail 14 is a support rail 22. Similar to the front rail 14, the support rail 22 has an upper bar 24 in a parallel relationship with a lower bar 26. As best seen in FIG. 1, a corner plate 28 is welded to each end of the support rail 22 and the front rail 14. It should be appreciated that the corner plate 28 interconnects the upper bar 24, the lower bar 26 of the support rail 22, and the upper bar 16 and the lower bar 18 of the front rail 14. Rotatably mounted to each corner plate 28 is a pneumatic front wheel 30.

Figure 2:
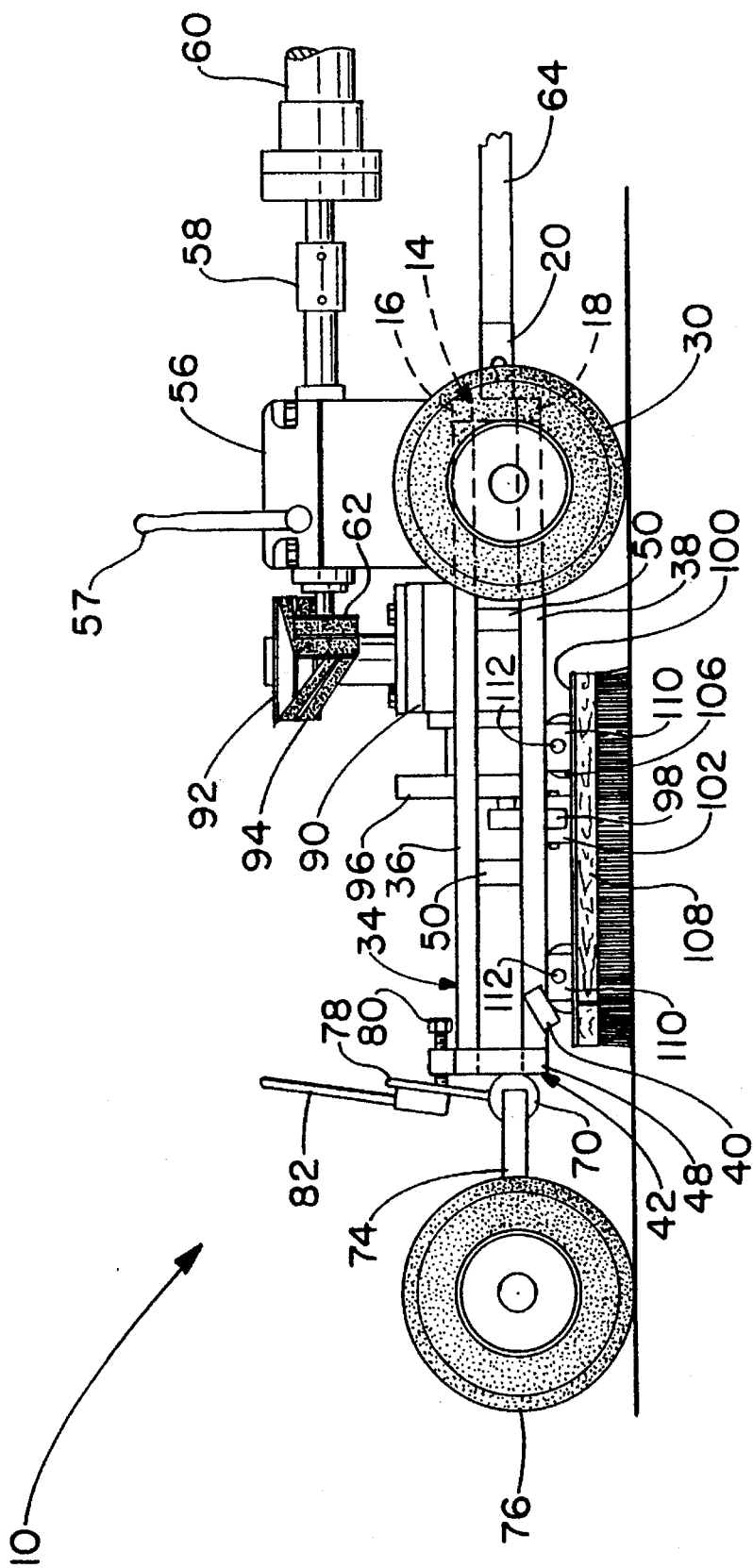
FIG. 2 is a side elevational view of a sand distributor and spreader according to the present invention.

Referring now also to FIG. 2, it can be seen that a pair of side rails 34 are perpendicularly interconnected to the ends of each support rail 22. In a construction similar to the front rail 14 and the support rail 22, each side rail 34 has an upper bar 36 and a lower bar 38. Outwardly mounted on each lower bar 38 is an angularly sloping stop 40.

As seen in FIGS. 1 and 3, securably interconnecting each end of the side rails 34 is a back rail 42. The back rail 42 also has an upper bar 44 and a lower bar 46 spaced in a parallel relationship similar to that of the front rail 14. It should be appreciated that a corner 48 interconnects each end of the upper bar 44 and the lower bar 46 to each other. It should be further appreciated that a plurality of braces 50 are strategically placed between the aforementioned upper and lower bars to provide strength and stability to the frame 12. Also interconnecting the upper bar 16 of the front rail 14 to the upper bar 44 of the back rail 42 are a pair of gear box rails 54. Although any rigid structural material may be used to construct the frame 12, preferably all of the aforementioned components, except the wheels, are made of steel.

Referring now to FIG. 2, securably mounted on the gearbox rails 54 is a gearbox 56. The gearbox 56 may provide as many as four speeds, but in the preferred embodiment only two speeds are required. A shift rod 57, which extends upwardly from the gearbox 56, is used to select the desired speed. As is well known in the art, the gear box 56 has a drive shaft coupler 58 for receiving various types of mechanical rotational power inputs. In the preferred embodiment, the drive shaft coupler will receive a power take off from a motorized vehicle, such as a tractor. Typically, the drive shaft coupler 58 is interconnected with the power take off by a drive shaft 60. The power output of the gear box 56 is provided in the form of a pulley 62 which is orthogonally connected to the output shaft 63 which extends horizontally outward from the gearbox 56.

Detachably connected to the coupler plates 20 is a tow bar 64. At the opposite end of the tow bar 64 is a hitch (not shown) for selectively connecting the frame 12 to the tractor or other motorized vehicle. The tow bar 64 allows for transport of the spreader 10 in operation and otherwise.

As seen in FIGS. 2 and 3, extending outwardly from the upper bar 44 of the back rail 42 are a pair of pivot mounts 70. Rotatably received within the pivot mounts 70 is a pivot axle 72 that extends the length of the back rail 42. Extending outwardly from each end of the pivot axle 72 is a transverse extension arm 74. Extending outwardly at the opposite end of each transverse extension arm 74 is a pneumatic rear wheel 76 rotatably mounted thereon. Transversely extending from the pivot axle 72 are a plurality of leveling plates 78. The leveling plates 78 are in a bearing relationship with a like plurality of leveling bolts 80, which are mounted to the upper bar 44 of the back rail 42. Extending transversely from the pivot axle 72 is a pivot arm 82. As those skilled in the art will appreciate, when a downward force is exerted on the pivot arm 82, the pivot axle 72 will rotate downwardly in a similar fashion to pivotally move the rear wheels 76 underneath the frame 12. It should be noted that the stops 40, integrally mounted on the lower bar 38, will function to stop the travel of the transverse extension arms 74 when a downward force is exerted on the pivot arm 82.

As can be seen from FIG. 1, perpendicularly connected to the support rail 22 is a gearbox arm 86. The gearbox arm 86 is disposed between the gearbox rail 54 and one of the side rails 34. A gearbox brace 88 angularly interconnects the end of the gearbox arm 86 with the support rail 22. Securably mounted between the gearbox arm 86 and side rail 34 is a right angle gearbox 90. A horizontal pulley 92 extends upwardly from the right angle gearbox 90. As can be seen in the drawings, a plurality of belts 94 interconnect the horizontal pulley 92 with the vertical pulley 62. Extending outwardly from the right angle gearbox 90 and rotatably driven thereby is a Pittman cam 96, which drives one end of a Pittman rod 98.

A best seen in FIG. 3, disposed underneath the frame 12 is a brush plate 100. Referring now to FIG. 2, it can be seen that upwardly extending from the brush plate 100 is a plate coupler 102. A coupler pin 104 functions to rotatably interconnect the opposite end of the Pittman rod 98 to the plate coupler 102. A pair of slide tubes 106 are securably mounted to the top of the brush plate 100. Extending downwardly from the brush 100 are a plurality of brushes 108. Although the brushes may be secured to the bottom side of the brush plate 100 in any manner, in the preferred embodiment the brushes are disposed at 18° angles with respect to the side rails 34. Furthermore, a set of end brushes are placed in a parallel relationship with the back rail 42 and perpendicular to the side rails 34.

Referring now to FIGS. 2 and 3, downwardly extending from the lower bar 38 of the side rails 34 are a plurality of corresponding mount blocks 110. Interconnecting the mount blocks 110 will be a pair of slide rails 112, which are slidably received within the slide tubes 106.

Before the present invention can be used, the putting surface or "greens" must be prepared. First, an aeration machine, which is usually in the form of a spiked roller, is driven or otherwise passed across the entire area of the putting surface. As discussed earlier, the aeration machine pulls small plugs of dirt out of the green and discards these plugs on the surface thereof. The advantages of aerating the putting green are well known in the art, these advantages include providing increased oxygen to the roots of the grass, improving the access of fertilizer to the roots of the grass, and improving the drainage of the putting surface. After the aeration procedure is complete, all of the plugs left by the aeration process are cleared of the putting surface. Next, a machine is used to broadcast large quantities of wet or dry sand over the surface of the green. As discussed earlier, the sand is used to fill in holes left by the aeration process. If the aeration holes were not filled in, the putting surface near the holes could conceivably collapse, thereby creating an uneven and undesirable putting surface.

As best seen in FIG. 1, the sand distributor and spreader 10 is connected to a motorized vehicle having a power take-off. Typically, two connections will be made between the spreader 10 and the vehicle. The first connection is a tow bar 64, which is connected at one end to the coupler plates 20 of the front rail 14 and at the other end to a hitch (not shown) which is mounted on the vehicle. The second connection is between the gearbox 56 the power take off of the tractor or other vehicle in a manner well known in the art. Depending upon the speed of the brushing motion desired, the greens keeper moves the shifter 57 out of the neutral position into the desired gear. The driver of the vehicle then engages the power take off to turn the drive shaft 60, which will correspondingly rotate the vertical pulley 62 extending from the gearbox 56. As seen in the drawings, as the pulley 62 rotates, a belt 94 correspondingly rotates the horizontal pulley 92 of the right angle gearbox 90. The right angle gearbox 90 then proceeds to rotatingly drive a Pittman cam 96, so as to drive the Pittman rod 98 which is connected at the opposite end to a plate coupler 102. Therefore, the plate coupler 102, which is integrally connected to the brush plate 100 will function to provide a reciprocating motion as the Pittman rod 98 is moved back and forth. In the preferred embodiment, the Pittman cam 96 has a six inch diameter, thereby providing a six inch range of motion for the brush plate 100.

It should now be appreciated that as the sand distributor and spreader 10 is driven across the putting surface with the gearbox 56 engaged, the brushes 108 integrally mounted to the underside of the brush plate 100 move in a reciprocating back and forth motion between the side rails 34 to evenly distribute and spread the wet or dry sand into the previously aerated holes. As best seen in FIG. 1, a majority of the brushes are disposed at an 18° angle with respect to the side rails 34. To prevent the brushes from leaving a swirling pattern on the surface of the green, a set of finishing brushes are mounted to the brush plate 100 in a direction perpendicular to the side rails 34 and parallel with the back rail 42.

As should be appreciated by those skilled in the art, this invention will effectively and uniformly distribute sand into the aerated holes of a putting surface. Any excess sand is evenly distributed over the surface of the green as a thin layer. Once all the sand has been distributed, the sand distributor and spreader 10 may be transformed so as to be easily transported to the next green. This is done by exerting a downward force on the pivot arm 82. This downward force rotates the pivot axle 72 so as to rotatably move the back wheels 76 underneath the side rails 34. As can best be seen in FIG. 3, the transverse extension arms 74 will then be placed in a bearing relationship with the stops 40 that are disposed on the lower bar 38. As a result, the brushes 108 are no longer engaged with the surface of the grass so that the spreader 10 can be easily transported to the next destination.

Thus, it can be seen that the objects of the invention have been satisfied by the structure presented above. It should be apparent to those skilled in the art that the objects of the present invention could be practiced by a device wherein the brushing motion and the wheels could be driven by one power source. It should also be appreciated that the brush plate could be lifted by other means including hydraulic or pneumatic cylinders.

While the preferred embodiment of the invention has been presented and described in detail, it will be understood that the invention is not limited thereto or thereby. Indeed, various materials and configurations may be used in the construction of the invention to meet the various need of the end user. Accordingly, for an appreciation of the true scope and breadth of the invention, reference should be made to the following claims.

What is claimed is:

1. A sand distributor and spreader, comprising:

means for carrying a frame, said frame having at least one pair of opposed slide blocks with a slide rail connected therebetween;

a brush plate having a slide tube extending upwardly therefrom, said slide tube receiving said slide rail therein, said brush plate having a plurality of brushes mounted to the underside thereof;

means for reciprocating said plurality of brushes to distribute and spread sand on a grass surface, said reciprocating means moving said brush plate on said slide rail; and means for transporting said means for carrying.

2. A sand distributor and spreader according to claim 1, wherein said means for transporting simultaneously powers said means for reciprocating.

3. A sand distributor and spreader according to claim 2, further comprising means for selectively raising and lowering said means for carrying.

4. A sand distributor and spreader according to claim 1, wherein said means for reciprocating comprises:

means for receiving input power; and means for converting said input power to alternatingly move said brushes between a first position and a second position.

5. A sand distributor and spreader according to claim 4, wherein said means for transporting comprises a vehicle;

said vehicle having a hitch for selectively interconnecting said means for carrying thereto; and also having a power take-off to provide input to said means for receiving.

6. A sand distributor and spreader according to claim 5, wherein said means for carrying further comprises:

a plurality of tires rotatably mounted to said frame;

a coupler for receiving said means for reciprocating, said coupler mounted to the top of said brush plate, said reciprocating means slidably moving said brush plate on said slide rail; and a tow bar mounted to said frame for interconnection to said means for transporting.

7. A sand distributor and spreader, comprising:

a frame having at least one pair of opposed slide blocks and having a slide rail connected between each said pair of slide blocks;

a brush plate having a slide tube extending upwardly from said brush said slide tube is slidably mounted on said slide rail, said brush plate, wherein plate having mounted to the underside thereof a plurality of brushes;

a power source mounted to said frame, said power source selectively reciprocating said brush plate on said slide rail between a first position and a second position to distribute and spread sand on a grass surface; and a plurality of wheels rotatably mounted to and extending outwardly from said frame to support said frame while said brush plate is reciprocating.

8. A sand distributor and spreader according to claim 7, further comprising means for lifting said plurality of brushes.

9. A sand distributor and spreader according to claim 8, wherein said means for lifting comprises:

a pivot axle rotatably supporting at least one said wheel;

a pivot arm transversely extending from said pivot axle, such that when said pivot arm is rotated said wheel lifts said brushes from a brushing position.

10. A sand distributor and spreader according to claim 9, further comprising:

a cam rotatably driven by said power source;

a rod pivotally connected to said cam at one end, and pivotally mounted to said brush plate at the opposite end, such that said brush plate is reciprocated between a first position and a second position.

11. A sand distributor and spreader, comprising:

a frame having a front rail having a pair of coupler plates extending therefrom a support rail parallel with said front rail, a pair of corner plates securably connecting said front rail to said support rail at their respective ends a back rail parallel with said support rail: a pair of side rails perpendicularly interconnecting each end of said support rail to each respective end of said back rail, a plurality of opposed mount blocks downwardly extending from each of said side rails, and at least one slide rail interconnecting said mount blocks:

at least one gear box mounted to said frame;

a brush plate slidably received on said slide rail;

a plurality of brushes mountably attached to said brush plate;

a plurality of wheels rotatably mounted to said corner plates;

a cam rod rotatably connected at one end of said gear box, and pivotally mounted at the opposite end to said brush plate; and a rotating drive shaft received by said gearbox for driving said cam rod, such that said brush plate alternatingly moves said brushes between a first position and a second position.

12. A sand distributor and spreader according to claim 11, further comprising:

a vehicle having a hitch and providing a power take-off for rotating said drive shaft; and a tow bar securably mounted to said coupler plates and detachably mounted to said hitch such that said vehicle transports said frame while said drive shaft is rotating.

13. A sand distributor and spreader according to claim 12, wherein said frame further comprises:

a pair of gear box rails securably interconnecting said front rail to said back rail; and a plurality of pivot mounts extending outwardly from said back rail for rotatably receiving a pivot axle, said pivot axle having at each end an outwardly transversely extending arm having a rotatably mounted wheel extending therefrom, said pivot axle also having a pivot arm transversely extending therefrom.

14. A sand distributor and spreader according to claim 13, wherein said gear box is securably mounted to said gear box rails, said gear box having a first pulley, said frame has a right angle gear box mounted therein and a second pulley extending therefrom, which is interconnected by a belt to said first pulley, said right angle gear box rotating a Pittman cam, which has a rod pivotally mounted thereto, the opposite end of said rod being pivotally mounted to said brush plate, which is slidingly received upon said slide rail, so as to reciprocate said brush plate between first and second positions.

15. A sand distributor and spreader according to claim 14, wherein said frame is lifted upwardly at said back rail by downwardly pushing said pivot arm so as to rotate said pivot axle, thereby moving said transversely mounted wheels underneath said frame.

* * * * *